United States Patent [19]

Manolis

[11] Patent Number: 5,203,298
[45] Date of Patent: Apr. 20, 1993

[54] PRE-COMBUSTION CHAMBER FOR INTERNAL COMBUSTION ENGINE

[76] Inventor: John Manolis, P.O. Box 380, New York, N.Y. 10028

[21] Appl. No.: 890,243

[22] Filed: May 29, 1992

[51] Int. Cl.$^5$ .................. F02M 19/00; F02B 19/00
[52] U.S. Cl. .................. 123/275; 123/273; 123/266
[58] Field of Search ......... 123/275, 266, 268, 267, 123/273, 285, 280, 585

[56] References Cited

U.S. PATENT DOCUMENTS

| | | | |
|---|---|---|---|
| 3,154,058 | 10/1964 | Warren | 123/267 |
| 3,661,125 | 5/1972 | Stumpfig | 123/255 |
| 4,061,114 | 12/1977 | Christopher | 123/266 |
| 4,077,368 | 3/1978 | Abthoff et al. | 123/286 |
| 4,091,771 | 5/1978 | Rapp et al. | 123/275 |
| 4,218,993 | 8/1980 | Blackburn | 123/267 |
| 4,303,045 | 12/1981 | Austin, Jr. | 123/266 |
| 4,332,223 | 6/1992 | Dalton | 123/266 |
| 4,765,293 | 8/1988 | Gonzalez | 123/275 |
| 4,892,070 | 1/1990 | Kuhnert | 123/266 |
| 4,977,873 | 12/1990 | Cherry et al. | 123/267 |

Primary Examiner—Raymond A. Nelli

[57] ABSTRACT

A pre-combustion chamber for internal combustion engine according to the present invention includes a cylindrical base portion having threads providing means for threadable engagement with a combustion chamber of an internal combustion engine, and a plurality of cylindrical inlet ports having threads providing means for threadable engagement with a spark plug, a glow plug, a fuel injector and an air injector.

5 Claims, 2 Drawing Sheets

PRE-COMBUSTION CHAMBER FOR INTERNAL COMBUSTION ENGINE

BACKGROUND OF THE PRESENT INVENTION

The present invention relates to a new pre-combustion chamber for internal combustion engine, which may be theadably attached to the spark plug port of an internal combustion engine. The new pre-combustion chamber is communicating with the main combustion chamber through a narrow path and it comprises a cylindrical base portion having outside threads providing means for threadable engagement with the main combustion chamber. The new pre-combustion chamber is having means defining a plurality of cylindrical ports with inside threads providing for threadable engagement with a spark plug, a glow plug, a fuel injector and an air injector.

The pre-combustion chamber will be used to improve the stratified charge of an internal combustion engine by triggering strata charge, as rich air-fuel mixture is introduced into the new pre-combustion chamber and lean air-fuel enters the main combustion chamber through the normal intake valve.

The new pre-combustion chamber will improve car mileage and it will reduce air pollution.

Many different ignition and combustion systems have been used in internal combustion engines in order to reduce fuel consumption and harmful components in the exhaust gases of an internal combustion engine and to prevent the waste of energy resources.

The conventional ignition and combustion systems, such as, spark plugs, glow plugs etc., possess many drawbacks and disadvantages, such as, the speed of ignitability and combustion is low and they are not practical for cold-start Diesel engines and stratified-charge engines. The pre-combustion chambers used in diesel engines, possess drawbacks and disadvantages, such as, they are part of the engine's block and they can not be removed and taken out for cleaning and maintenance. The present invention is providing a new pre-cobustion chamber which can be removed for cleaning and maintenance.

SUMMARY OF THE INVENTION

It is an object of the present invention to provide a new threadable attached pre-combustion chamber for internal combustion engine.

It is another object of the present invention to provide a new pre-combustion chamber which has a cylindrical base portion with outside threads similar to the threads of a conventional spark plug.

It is a further object of the present invention to provide a new pre-combustion chamber which is having means defining a plurality of cylindrical ports with inside threads providing for threadable engagement with a spark plug, a glow pluk, a fuel injector and an air injector.

DESCRIPTION OF THE PREFERRED EMBODIMENTS

The present invention will be described with reference to the preferred embodiments in conjuction with the accopanying drawings.

Figure 1:
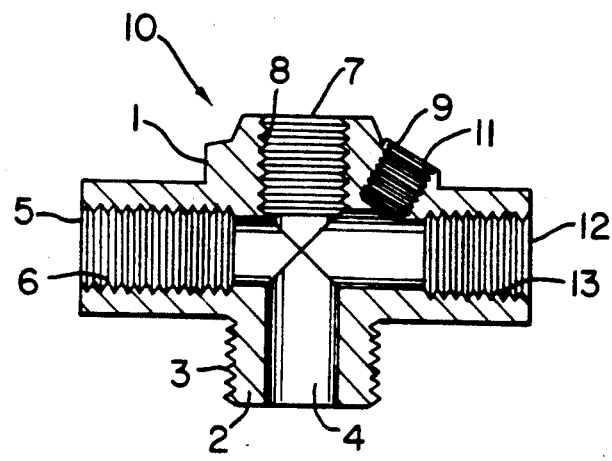
FIG. 1 is a longitudinal view of the pre-combustion chamber in accordance with the present invention.
Figure 2:
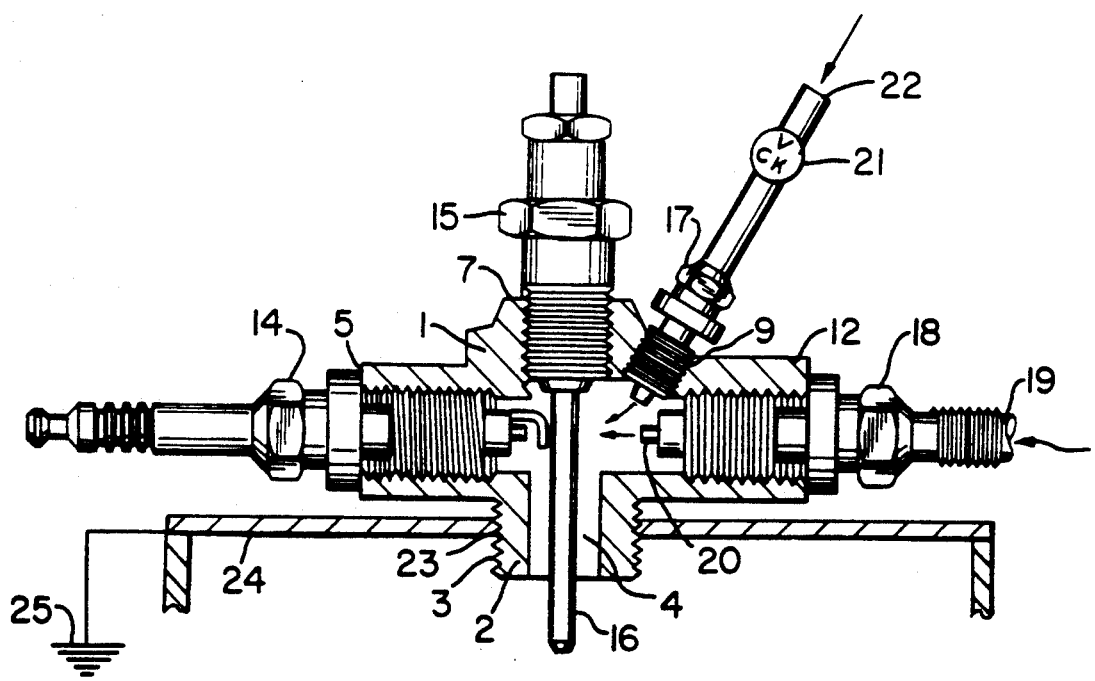
FIG. 2 is a longitudinal view of the same as in FIG. 1, showing the arragement of the pre-combustion chamber with the spark plug, glow plug, fuel injector and air injector.

Referring now in more detail to the drawing FIGS. 1 and 2, the pre-combustion chamber 4 indicated at 10 is having a cylindrical base portion 2 with outside threads 3 providing for threadable engagement with the port 23 of cylinder 32. The pre-combustion chamber 4 is having a cylindrical port 5 with inside threads 6 providing for threadable engagement with a spark plug 14, a cylindrical port 7 with inside theads 8 providing for theadable engagement with a glow plug 15, a cylindrical port 9 with inside threads 11 providing for threadable engagement with an air injector 17 and a cylindrical port 12 with inside threads providing for threadable engagement with a fuel injector 18.

Figure 3:
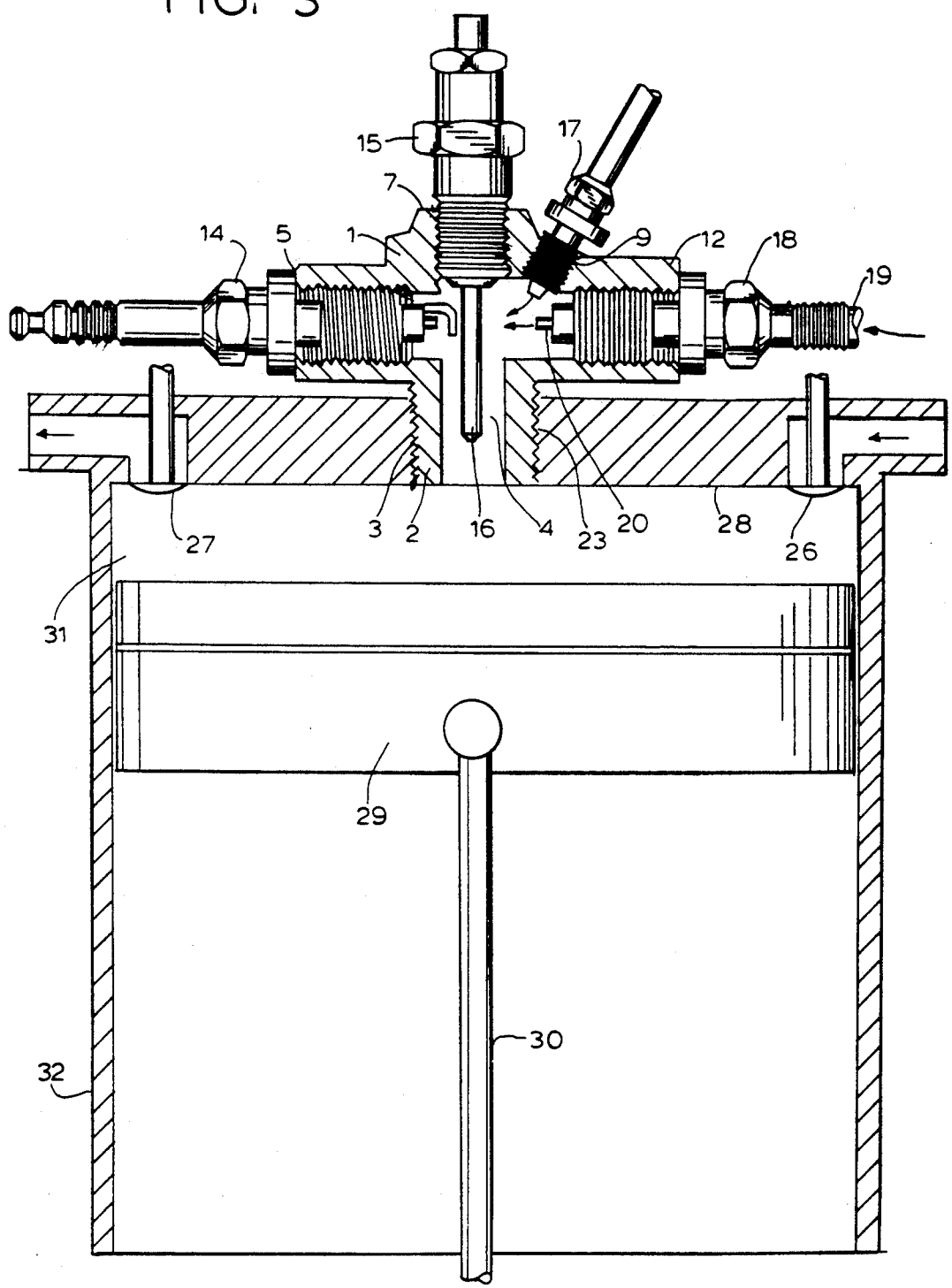
FIG. 3 is a longitudinal view of a piston cylinder of an internal combustion engine employing the new pre-combustion chamber of the present invention.

Referring now to FIG. 3.

The cylinder 32 is having a piston 29 with its pisto rod 30, an intake valve 26, an exhaust valve 27, the cylinder's head 28 and a cylindrical port 23 with inside threads providing for threadable engagement with the pre-combustion chamber 4 allowing communication between pre-combustion chamber 4 and main combustion chamber 31.

In Operation: During the operation of the internal combustion engine 32 the piston 29 is moving downward, the exhaust valve 27 closes, and the intake valve 26 opens and lean air-fuel mixture enters into the combustion chamber 31. The fuel injector 18 sprays fuel directly on the heating element 16 of the glow plug 15, the fuel boils and triggers smoke and condensed fuel vapors, and the pre-combustion chamber 4 is filled with high pressured unburned rich air-fuel mixture. The main combustion chamber 31 is filled with lean air-fuel mixture.

During the compression stroke the piston 29 moves upward compressing the lean air-fuel mixture into the main combustion chamber 31 and the rich air-fuel mixture into the pre-combustion chamber 4 forming the strata charge. As the piston 29 approches the top of its stroke, the spark plug 14 is fired to ignite the rich air-fuel mixture in the pre-combustion chamber 4 and triggers flames. These flames under high pressure and high speed are propelled downward via a force and interact with the compressed lean air-fuel mixture in the combustion chamber 31.

The high-speed flames and the ionized gas are expect to promote rapid combustion, particularly in a lean air-fuel mixture. It also has a potential to be used as a cold-start in Diesel engines, internal combustion engines or the like.

The pre-combustion chamber 4 of the present invention creates a vortex rich air-fuel mixture which will ignite and burn lean air-fuel mixture in the combustion chamber 31. This will improve fuel efficiency and reduce air pollution.

Moreover, the present invention can adopt modes of various modifications and deformations in addition to any suitable selected combination of the aforementioned respective embodiments if it is within the scope of the claim.

What is claimed is:

1. A pre-combustion chamber for internal combustion engine comprising:
   (i) a cylindrical base portion having threads providing means for threadable engagement with a combustion chamber of an internal combustion engine; and
   (ii) a plurality of cylindrical inlet ports having threads providing means for threadable engagement with a spark plug, a glow plug, a fuel injector and an air injector.

2. A pre-combustion chamber for internal combustion engine according to claim 1, wherein said cylindrical base portion provides communication between said pre-combustion chamber and said combustion chamber of an internal combustion engine.

3. A pre-combustion chamber for internal combustion engine according to claim 1, wherein said pre-combustion chamber is made of steel.

4. A pre-combustion chamber for internal combustion engine according to claim 1, wherein said pre-combustion chamber is made of aluminum.

5. A pre-combustion chamber for internal combustion engine according to claim 1, wherein said pre-combustion chamber is made of ceramic.

* * * * *